US008624415B2

United States Patent
Koenig

(10) Patent No.: US 8,624,415 B2
(45) Date of Patent: Jan. 7, 2014

(54) MULTI-ROTOR GENERATOR

(75) Inventor: Andreas C. Koenig, Machesney Park, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 78 days.

(21) Appl. No.: 13/450,979

(22) Filed: Apr. 19, 2012

(65) Prior Publication Data

US 2013/0277976 A1    Oct. 24, 2013

(51) Int. Cl.
*H02K 16/02*    (2006.01)
(52) U.S. Cl.
USPC ............................. 290/52; 310/114
(58) Field of Classification Search
USPC ...................... 290/52; 310/112, 114
See application file for complete search history.

(56) References Cited

U.S. PATENT DOCUMENTS

| | | | |
|---|---|---|---|
| 5,376,827 A * | 12/1994 | Hines | 290/52 |
| 6,794,781 B2 * | 9/2004 | Razzell et al. | 310/114 |
| 7,573,176 B2 * | 8/2009 | Shibukawa | 310/268 |
| 7,880,355 B2 * | 2/2011 | Qu et al. | 310/103 |
| 8,063,527 B2 * | 11/2011 | Qu et al. | 310/112 |
| 8,222,784 B2 * | 7/2012 | Serra et al. | 310/114 |
| 2003/0184245 A1 * | 10/2003 | Arimitsu | 318/268 |

* cited by examiner

*Primary Examiner* — Joseph Waks
(74) *Attorney, Agent, or Firm* — Kinney & Lange, P.A.

(57) ABSTRACT

A generator system comprises an inner generator rotor, an outer generator rotor, and a stator. The inner rotor is mounted on the first shaft rotating at a first speed, while the outer rotor is mounted on a second shaft coaxial with the first shaft, and rotating at a second speed different from the first speed. The outer rotor is mounted coaxially with and radially outward of the inner rotor, and the stator is mounted coaxially with and radially outward of the outer rotor.

20 Claims, 2 Drawing Sheets

MULTI-ROTOR GENERATOR

BACKGROUND

The present invention relates generally to electrical machines, and more particularly to a multi-rotor generator for use in aircraft.

Most modern aircraft are primarily powered by gas turbine engines. Gas turbine engines are Brayton cycle engines comprising a compressor, a combustor, and a turbine. The compressor pressurizes environmental air, typically via multiple stages of rotary blades and stationary vanes. The combustor injects fuel into the high-pressure air stream provided by the compressor, and combusts the resulting fuel-air mixture. The turbine extracts energy from the resulting high-pressure, high-temperature airflow. This extracted energy is used to drive the compressor, and to power other systems. Many aircraft gas turbine engines are connected to rotary generators via mechanical gearboxes to supply electrical power to aircraft systems. The power and propulsion demands of commercial aircraft continue to increase.

Most modern commercial aircraft use multi-stage gas turbine engines with separate high and low pressure spools. High pressure turbines operate at high speeds, extracting energy from gas leaving the combustor to drive high pressure compressor stages immediately upstream of the combustor via a high pressure shaft. Low pressure turbines operate at much lower speeds but considerably more variable speed range, and extract energy from gas leaving the high pressure turbine. Low pressure turbines are connected via low pressure shafts which drive low pressure compressors. Gearboxes for electrical generators are conventionally attached to the high pressure shaft, and extract energy from the high pressure spool. Gearboxes can add considerable weight and mechanical complexity to turbine/generator systems.

Many generator systems for aircraft use generation systems with three rotating machines on a common shaft: a main generator, an exciter, and the permanent magnet generator (PMG). The largest of these is the main generator, commonly of a wound rotor synchronous type. The rotor of a generator of this type has a field winding that is provided with DC current to create a magnetic field that spins in synchronism with the rotor. The exciter commonly consists of a stationary field winding with a rotating armature winding. The alternating current from the rotating armature winding is rectified to a direct current using a rotating rectifier and is fed to the wound rotor of the main generator. The current in the field winding of the exciter is controlled by a generator control unit (GCU) to provide the required output from the main generator. The GCU may be designed such that it can be powered by either the main generator or the permanent magnet generator (in the event that the main generator is not yet providing electricity). The permanent magnet generators comprise permanent magnet rotors with wound stators connected to the GCU.

Turbofans are often classified by bypass ratio, the ratio of bypass airflow (i.e. airflow through a fan which bypasses the compressor, combustor, and turbine) to compressor airflow. The trend in recent engines is for higher bypass ratios, with the result that less power is available from the high pressure spool for electrical power generation.

SUMMARY

The present invention is directed toward a generator system with an inner generator rotor, an outer generator rotor, and a stator. The inner rotor is mounted on the first shaft rotating at a first speed, while the outer rotor is mounted on a second shaft coaxial with the first shaft, and rotating at a second speed different from the first speed. The outer rotor is mounted coaxially with and radially outward of the inner rotor, and the stator is mounted coaxially with and radially outward of the outer rotor.

DETAILED DESCRIPTION

Figure 1:
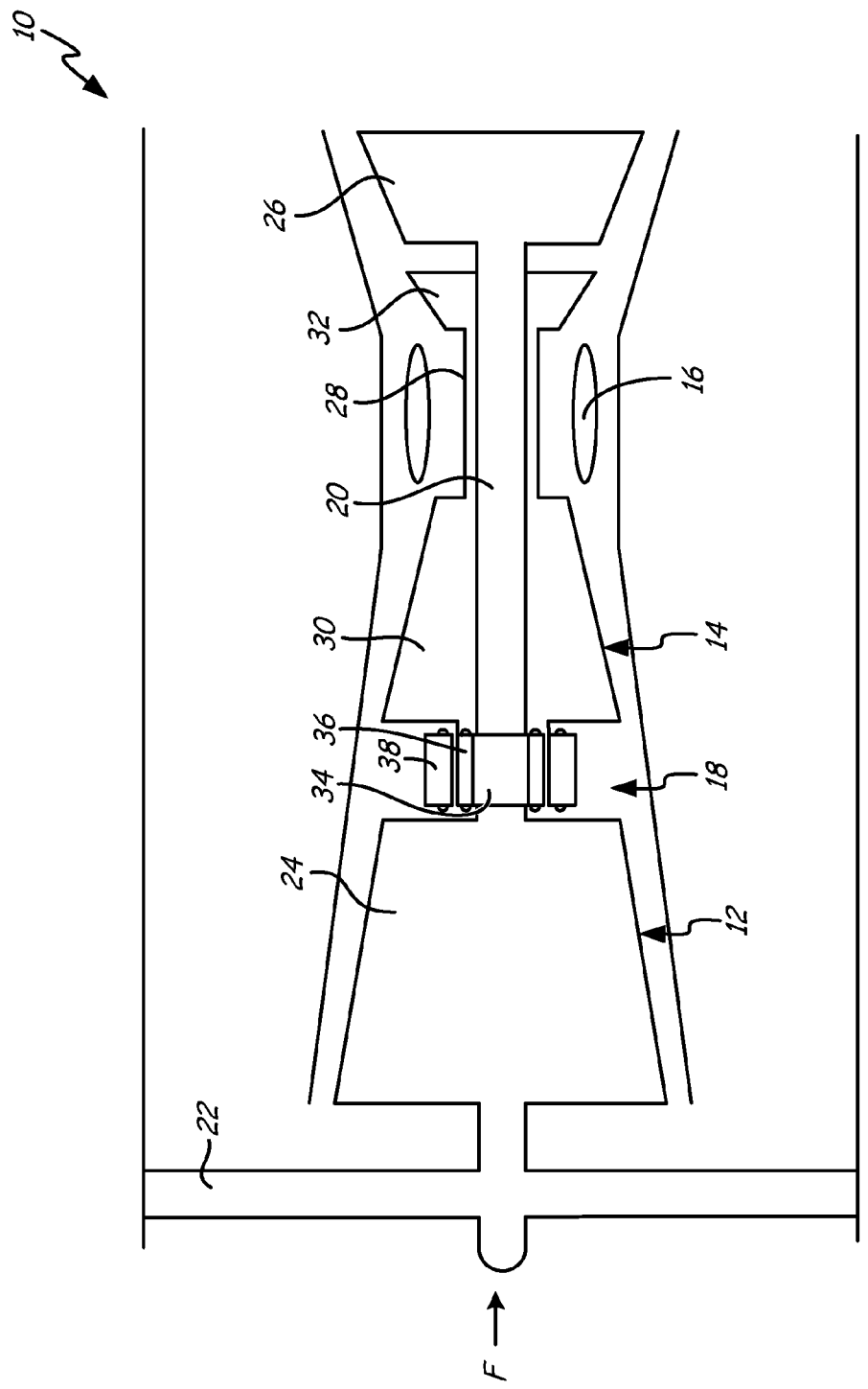
FIG. 1 is a schematic cross-sectional view of an aircraft turbine/generator system according to the present invention.

FIG. 1 is a schematic cross-sectional view of turbine/generator system 10. Turbine/generator system 10 is depicted as a turbofan system, although other forms of aircraft propulsion gas turbine systems could equivalently be used. Turbine/generator system 10 is a two spool aircraft power and propulsion system comprising low pressure spool 12, high pressure spool 14, combustor 16, and generator 18. Low pressure spool 12 comprises low pressure shaft 20, fan 22, low pressure compressor 24, and low pressure turbine 26. High-pressure spool 14 comprises high pressure shaft 28, high pressure compressor 30, and high pressure turbine 32. Generator 18 comprises inner rotor 34, outer rotor 36, and stator 38. Air flows through turbine/generator system 10 substantially in flow direction F.

Low pressure spool 12 and high pressure spool 14 are separately rotating spools of turbine/generator system 10. Fan 22 and low pressure compressor 24 are driven by low pressure shaft 20, and pressurize environmental air, driving it into high pressure compressor 30. High pressure compressor 30 is driven by high pressure spool 20, and further compresses pressurized air received from low pressure compressor 24. Pressurized air from high pressure compressor 30 is mixed with fuel (supplied by a fuel system not depicted in FIG. 1) in combustor 16, where this fuel-air mixture is ignited. High pressure turbine 32 extracts energy from the resulting high-temperature, high-pressure gas in the form of torque on high pressure shaft 28, and low pressure turbine 26 similarly extracts energy from gas exiting high pressure turbine 32 in the form of torque on low pressure shaft 20. High pressure shaft 28 and low pressure shaft 20 drive high pressure combustor 30 and low pressure combustor 24, respectively. All elements of low pressure spool 12 rotate at one shared speed, while all elements of high pressure spool 14 rotate at another. In some embodiments of turbine/generator system 10, blades and vanes of high pressure compressor 30, low pressure compressor 24, high pressure turbine 32, and high pressure turbine 26 may be configured such that high pressure spool 14 and low pressure spool 12 rotate in opposite directions. Operational speeds of high pressure spool 14 exceed operational speeds of low pressure spool 12, but vary less. The ratio of upper to lower bounds of rotational speeds of high pressure spool 14 may, for instance, be on the order of 2:1, as contrasted with a ratio of 5:1 for low pressure spool 12.

Generator 18 is a multi-rotor electrical generator which produces electrical power from relative rotation of low pressure shaft 28 and high pressure shaft 20, as described in greater detail below with respect to FIG. 2. In alternative embodiments inner rotor 34 may be a wound field or permanent magnet rotor. Outer rotor 34 is a wound induction type rotor, while stator 38 is a wound stator which extracts electricity from changes in magnetic flux. Electricity from generator 18 may power a variety of aircraft systems, including navigation systems, cabin lighting and air circulation, and mechanical actuators for aircraft wings and wheels.

As noted above, bypass ratios have been increasing in recent aircraft, leaving less power available for extraction from high pressure spool 14 for electrical applications. Generator 18 alleviates this limitation by drawing power both from high pressure spool 14 and from low pressure spool 12. In addition, turbine/generator system 10 dispenses with the large, heavy gearbox found in conventional aircraft generator systems. By mounting inner rotor 34 and outer rotor 36 directly on low pressure shaft 20 and high pressure shaft 28, respectively, turbine/generator 10 allows generator 18 to be embedded near low pressure compressor 24 and high pressure compressor 30, thereby lowering the overall weight and size of turbine/generator system 10.

Figure 2:
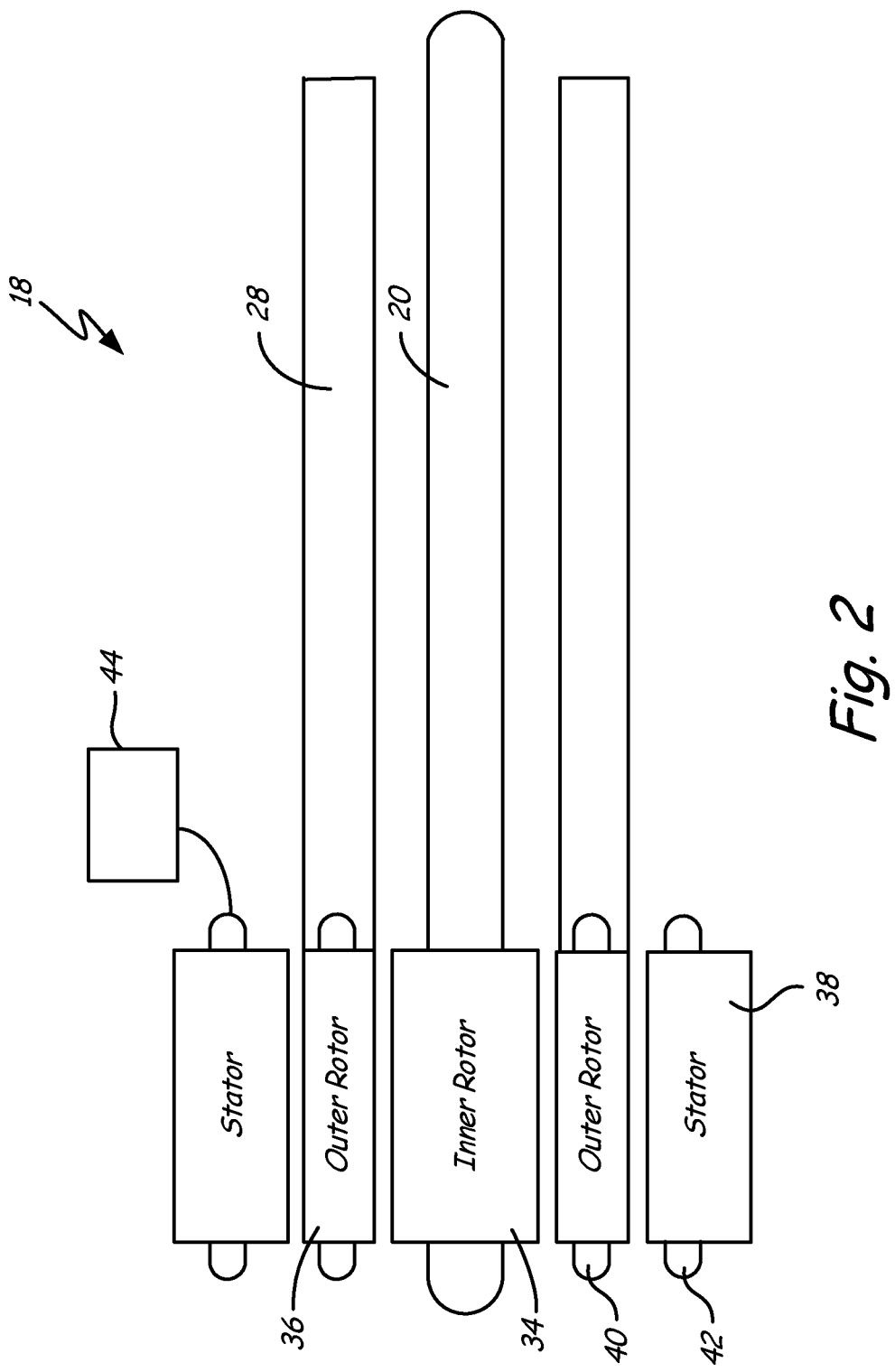
FIG. 2 is a schematic cross-sectional view of a multi-rotor generator of the aircraft turbine/generator system of FIG. 1.

FIG. 2 is a schematic cross-sectional view of generator 18, comprising low pressure shaft 20, high pressure shaft 28, inner rotor 34, outer rotor 36, stator 38, outer rotor windings 40, stator windings 42, and power converter 44. As discussed above with respect to FIG. 1, low pressure shaft 20 and high pressure shaft 28 are co-axial torque shafts which carry torque from low pressure turbine 26 and high pressure turbine 32, respectively. High pressure shaft 28 drives outer rotor 36, and low pressure shaft 20 drives inner rotor 34. High pressure shaft 28 and low pressure shaft 20 rotate at different speeds, and in some embodiments may rotate in opposite directions. Inner rotor 34 may be a permanent magnet rotor or a wound field rotor, and outer rotor 40 may be a squirrel cage or wound induction rotor. Stator 38 is a wound stator with a plurality of conductive stator windings 42 through which changing magnetic flux from outer rotor 36 induces current.

Inner rotor 34 produces a magnetic field which rotates during operation of generator 18. This rotating magnetic field has a field rotation frequency at outer rotor 36 equal to the difference in rotational speed (in RPM) between high pressure shaft 28 and low pressure shaft 20. In embodiments of turbine/generator system 10 wherein high pressure shaft 28 and low pressure shaft 20 are configured to rotate in opposite directions, this field rotation frequency will be especially large. Depending on shaft speed ranges, the ratio of maximum to minimum field rotation frequency at outer rotor 36 can be significantly reduced relative to the ratio of maximum to minimum speeds of low pressure shaft 20, promoting substantially constant or narrower range variable frequency power output.

Outer rotor 36 may be a wound rotor comprising a rigid support structure and a plurality of outer rotor windings 40 comprising coils of conductive wire. Alternatively, outer rotor 36 may be a squirrel cage. In either case, inner rotor 34 produces a magnetic field that induces currents in outer rotor 36. These currents in turn produce a field that couples to stator 38. Power converter 44 receives and conditions electrical power from stator 38 for use by aircraft systems. Power converter 44 may, for instance, include a three-phase inverter/rectifier bridge to stator 38.

In a first embodiment, inner rotor 34 is a wound rotor fed by a secondary current source, such as a secondary generator or an energy storage device connected by a brush contact. In this first embodiment, inner rotor 34 produces a strong magnetic field that induces currents in outer rotor 36 based on relative motion of inner rotor 34 and outer rotor 36. By coupling these induced currents to stator 38, generator 18 allows large amounts of energy to be extracted from both inner low-pressure shaft 20 and high-pressure shaft 28.

In a second embodiment, inner rotor 34 is a permanent magnet rotor. In this second embodiment, inner rotor 34 comprises a plurality of circumferentially spaced permanent magnets which produce a relatively weak magnetic field at outer rotor 36 that varies as inner rotor 34 rotates with respect to outer rotor 36. As in the first embodiment, this magnetic field at outer rotor 36 induces a current coupled to stator 38. The field produced by inner rotor 34 is selected to be relatively weak, so that generator 18 can be readily deactivated during fault conditions, to avoid damaging outer rotor windings 40 or stator windings 42. Higher magnetic field strengths could be utilized (for instance using more or stronger permanent magnets), but would necessitate additional mechanisms to electrically or mechanically de-energize inner rotor 34 during fault conditions. Low field strengths from inner rotor 34 allow less power to be drawn from low pressure shaft 20, but allow generator 18 to be "bootstrapped" when secondary starting power is unavailable. This second embodiment allows generator 18 to eschew secondary starter generators or energy storage devices, reducing total generator mass and bulk.

In a third embodiment, inner rotor 34 could comprise both fed conductive windings and permanent magnets. The inclusion of permanent magnets would enable rotor 34 to be used to bootstrap generator 18 during starting conditions, while conductive windings could subsequently be fed to allow greater power to be extracted from low pressure shaft 20. This third embodiment would utilize significantly more complex wiring, but would combine the advantages of the first and second embodiments.

All embodiments of turbine/generator system 10 allow generator 18 to be mounted in a relatively cool region of an aircraft gas turbine engine, such as between low pressure compressor 24 and high pressure compressor 30. By directly coupling generator 18 to low pressure shaft 20 and high pressure shaft 28, turbine/generator system 10 dispenses with heavy, bulky gearboxes.

All embodiments of generator 18 further allow at least some power to be extracted from low pressure shaft 20, unlike conventional systems wherein power generation systems are driven exclusively by high pressure shaft 28. These embodiments can reduce the overall speed range of the generator, promoting constant or relatively narrow variable frequency output. Generator 18 may be made still more compact for embodiments of turbine/generator system 10 wherein low pressure spool 12 and high pressure spool 14 counter rotate. Generator 18 may also be used to transfer power from low pressure shaft 20 of low pressure spool 12 to high pressure shaft 28 of high pressure spool 14, or vice versa, to modify engine dynamics to the benefit of the thermal cycle of turbine/generator system 10.

The first and third embodiments disclosed above allow greater energy to be extracted from low pressure shaft 20. The second and third embodiments disclosed above allow turbine/generator system 10 to dispense with additional starter hardware (e.g. permanent magnet stator and exciter), saving space and weight.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine/generator system comprising:
 a multispool gas turbine having a high pressure shaft and a low pressure shaft;
 an inner rotor mounted on the low pressure shaft;
 an outer induction rotor mounted on the high pressure shaft coaxially with and radially outward of the inner rotor; and
 a stator mounted coaxially with and radially outward of the outer induction rotor.

2. The turbine/generator system of claim 1, wherein the inner rotor comprises a plurality of permanent magnets configured to induce current on the outer induction rotor during operation.

3. The turbine/generator system of claim 1, wherein the inner rotor is a fed wound rotor, and further comprising a starter power source connected to the fed wound rotor.

4. The turbine/generator system of claim 3, wherein the inner rotor is fed by a secondary current source.

5. The turbine/generator system of claim 1, wherein the outer induction rotor is a wound induction rotor.

6. The turbine/generator system of claim 1, wherein the outer induction rotor comprises a squirrel cage.

7. The turbine/generator system of claim 1, and further comprising a power converter w/ an inverter/rectifier bridge to the stator.

8. The turbine/generator system of claim 1, wherein the multispool gas turbine is an aircraft propulsion turbofan engine.

9. The turbine/generator system of claim 1, wherein the inner rotor comprises both permanent magnets and windings fed from the stator.

10. The turbine/generator system of claim 1, wherein the inner rotor, the outer induction rotor, and the stator are situated in a cool region of the multispool gas turbine engine.

11. The turbine/generator system of claim 1, wherein the high pressure shaft and the low pressure shaft are configured to rotate in opposite directions.

12. A multi-rotor generator comprising:
 an inner rotor mounted on a first rotating shaft configured to rotate at a first speed range;
 an outer rotor mounted concentric with and radially outward of the inner rotor, on a second rotating shaft concentric with the first rotating shaft and configured to rotate at a second speed range not equal to the first speed range;
 a stator mounted concentric with and radially outward of the outer rotor.

13. The multi-rotor generator of claim 12, wherein the inner rotor is a wound rotor.

14. The multi-rotor generator of claim 13, further comprising a starter power source coupled to the wound rotor.

15. The multi-rotor generator of claim 12, wherein the inner rotor comprises a plurality of circumferentially spaced permanent magnets.

16. The multi-rotor generator of claim 15, wherein the inner rotor further comprises a plurality of windings fed by the stator.

17. The multi-rotor generator of claim 12, wherein the outer rotor is an induction rotor.

18. The multi-rotor generator of claim 17, wherein the induction rotor is a squirrel cage.

19. The multi-rotor generator of claim 17, wherein the induction rotor is a wound induction rotor.

20. The multi-rotor generator of claim 12, wherein multi-rotor generator is embedded in a cool region of the gas turbine.

* * * * *